Nov. 4, 1952          C. E. JOHNSON          2,616,459
CIRCULAR SAW MACHINE FOR MULTIPLE GROOVING
Filed June 28, 1947          2 SHEETS—SHEET 1

INVENTOR.
Carl E. Johnson.
BY
Harness, Dickey & Pierce.
ATTORNEYS.

Nov. 4, 1952         C. E. JOHNSON         2,616,459

CIRCULAR SAW MACHINE FOR MULTIPLE GROOVING

Filed June 28, 1947         2 SHEETS—SHEET 2

INVENTOR.
Carl E. Johnson.
BY
Harness, Dickey & Pierce.
ATTORNEYS.

Patented Nov. 4, 1952

2,616,459

UNITED STATES PATENT OFFICE 2,616,459

CIRCULAR SAW MACHINE FOR MULTIPLE GROOVING

Carl E. Johnson, Lincoln Park, Mich.

Application June 28, 1947, Serial No. 757,748

6 Claims. (Cl. 144—133)

This invention relates broadly to new and useful improvements in circular table saws, and more particularly to a saw of this type which is primarily adapted and pre-eminently suited for cutting a plurality of uniformly spaced, essentially square and relatively wide notches along the edge of a board or the like to form a conventional slip or lock joint.

An important object of the present invention is to provide a circular table saw of the abovementioned character so constructed as to support boards of varying size and thickness in edgewise relation to the table and operable to move the board across the table and over the cutting means.

Another object of the invention is to provide a circular table saw of the above-mentioned character wherein the cutting means is uniquely adapted to make a relatively wide notch or groove in the work in a single operation.

Still another object of the invention is to provide a circular table saw of the above-mentioned character wherein the cutting means comprises a plurality of conventional circular saw blades uniquely combined and correlated to produce the effect described in the preceding object.

Yet another object of the invention is to provide a circular table saw of the above-mentioned character having novel means for selectively and uniformly spacing the notches or grooves in the work.

A further object of the invention is to provide a circular table saw of the above-mentioned character wherein the spacing of the notches or grooves can be varied by a simple adjustment according to the exigencies of the particular situation.

A yet further object of the invention is to provide a circular table saw of the above-mentioned character having novel means for controlling the depth of cut of the saw blades.

Other objects and advantages of the invention will be apparent during the course of the following description.

Figures 1, 2:
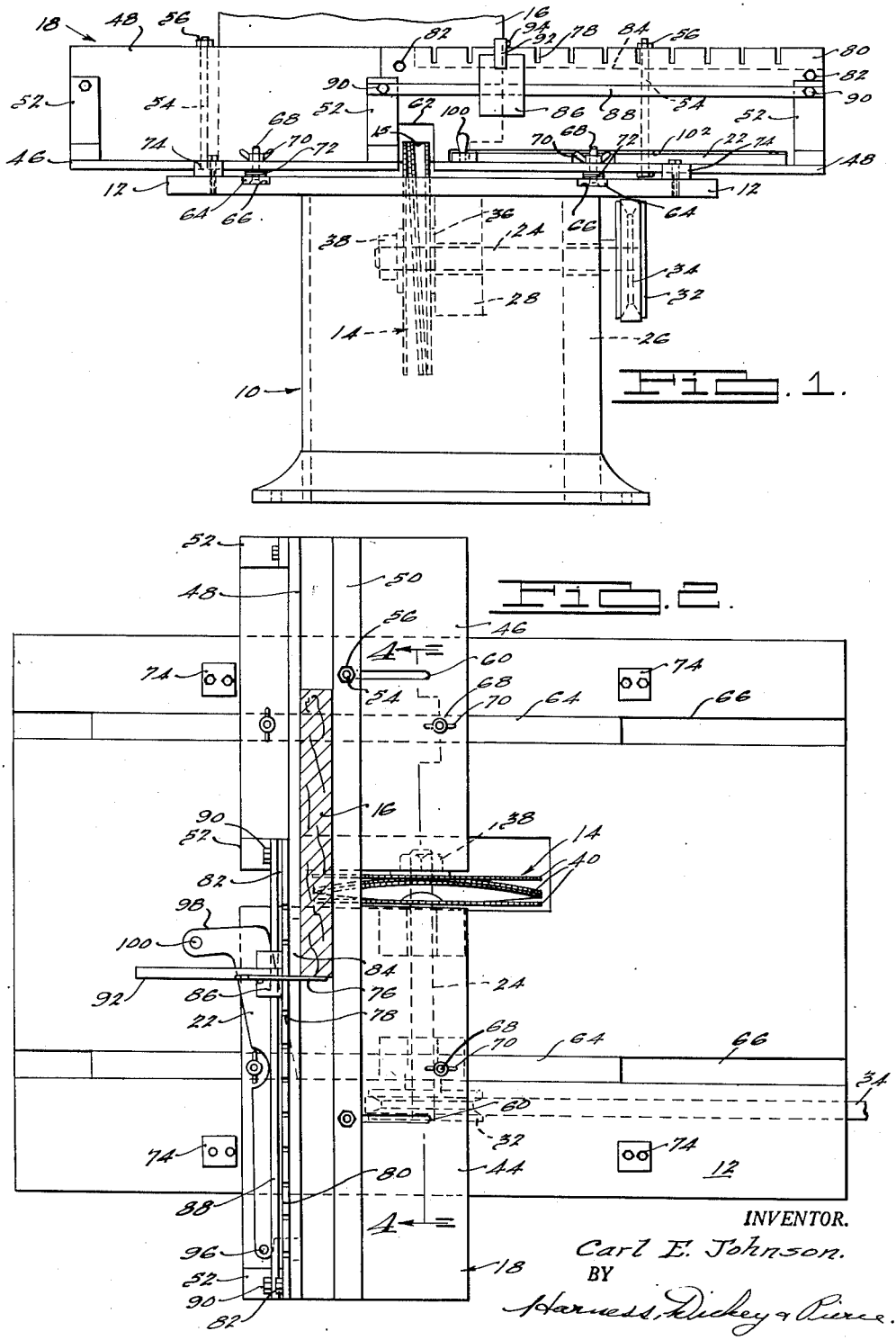
Figure 3:
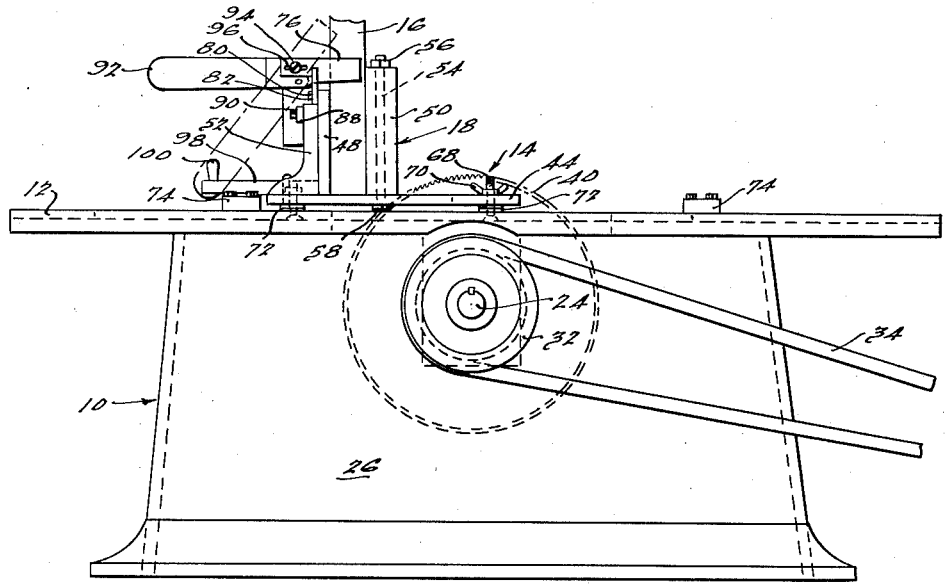
Figure 4:
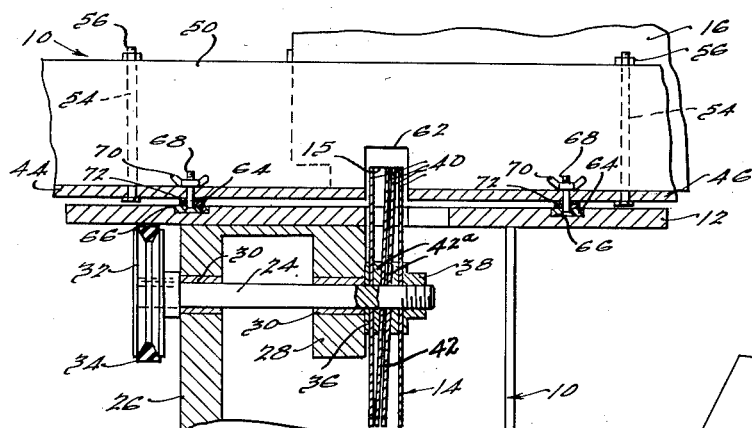
Figure 5:
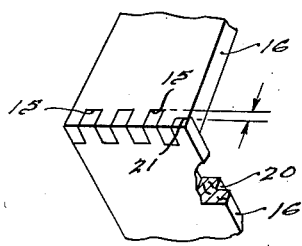

In the drawings forming a part of the specification and wherein like numerals are employed to designate like parts throughout the same, Fig. 1 is an end elevational view of a circular table saw embodying the invention, Fig. 2 is a top plan view thereof, Fig. 3 is a side elevational view of the same, Fig. 4 is a fragmentary, vertical sectional view taken on the line 4—4 of Fig. 2, and Fig. 5 is a fragmentary perspective view showing two boards joined together substantially at right angles to each other by a conventional slip or lock joint of the type formed by the circular table saw of this invention.

Reference is now had to the accompanying drawings wherein, for the purpose of illustration, is shown a preferred embodiment of the invention. The machine there shown is provided with a generally rectangular, hollow base 10 having a substantially horizontal top or table 12. Mounted for rotation in the hollow base 10 and projecting upwardly through the table 12 is a rotatably driven cutting means or saw 14, which saw is adapted to cut a relatively wide, generally rectangular notch 15 in the edge of a board or similar workpiece 16 each time the latter is moved horizontally across the table 12 and against the projecting portion of the saw. As suggested, the machine is adapted to cut a plurality of identical, uniformly spaced notches 15 in one or more edges of the board 16 and is pre-eminently suited for notching the ends of two or more boards so that they interfit to form a conventional slip or lock joint, as shown in Fig. 5.

According to the present invention, the board 16 is clamped in a suitable carriage 18 which is mounted on the table 12 and guided for translatory movement in a direction parallel to the plane of saw 14. As the carriage 18 moves across the table 12 it carries the clamped board 16 and moves the lower edge thereof against and across the saw 14 so that the latter cuts a notch therein which is as wide as the saw and as deep as the distance the saw projects above the table minus the distance of the work above the table.

In order to assume uniform spacing of notches 15, the carriage 18 is provided with an indexing mechanism which controls the position of workpiece 16 therein. In practice, the workpiece is moved in the carriage laterally across the table and transversely to the saw to predetermined spaced positions controlled by the indexing mechanism, which positions correspond to the spacing of the notches 15 to be cut in the work. The carriage 18 is actuated each time the work 16 is moved to a new position so that a notch 15 is cut in the work for each position of the same in the carriage. Thus, by moving the work 16 from one position to another in the carriage 18 and actuating the carriage to move the work against saw 14 in each position of the workpiece, a crenelated edge is formed on the work; and by forming two workpieces in the manner described with the crenelations or notches in staggered relation with respect to each other, the two ends can be interfitted, as shown in Fig. 5, to form a conventional slip or lock joint.

Under certain conditions, as when a rabbet 20 is provided along the inner edge of one or both of the workpieces 16, it may be necessary to vary the depth of cut in order to insure proper fitting of the two workpieces 16. For example, in Fig. 5 the lower workpiece 16 is shown with such a rabbet 20, and it will be observed that this rabbet substantially reduces the thickness of the board. As a result of the reduced thickness, it is necessary to make the endmost notch 21 in the upper board 16 considerably shallower than the other notches 15.

According to this invention, one or more relatively shallow notches 21 can be formed easily and quickly in the work 16 by swinging a pivoted bar 22 on the carriage 18 (Fig. 2) to a position under the work when the carriage is actuated to form the relatively shallow notch. Bar 22 normally is swung outwardly to the position shown in the drawing so that the workpiece 16 rests solidly on the bottom of the carriage 18, and with the parts thus positioned the depth of cut is determined by the distance which the carriage holds the workpiece raised above the table 12. However, when bar 22 occupies a position under the workpiece 16, the latter is elevated a distance corresponding to the thickness of the bar and the depth of cut is correspondingly reduced. If desired, bars of various thickness can be used on the machine according to the exigencies of the particular situation. In any case where a large number of parts having uniform and standard dimensions are to be made, the instant machine will permit the crenelated ends to be formed easily and expeditiously.

More specifically, the saw 14 is carried by and rotatable with a horizontal driven shaft 24 which is journaled for rotation in one vertical wall 26 of the base 10 and a laterally spaced flange 28 which depends from the top of and within the base. Bushings 30 provide suitable bearings for the shaft 24, and the outer end of the latter carries a pulley 32 which is connected to a motor or the like (not shown) by an endless belt 34. As best shown in Fig. 4, saw 14 is mounted on the inner end of shaft 24 between a radial flange 36 formed integrally on the latter and a flanged nut 38 threaded on the end of the shaft.

The saw per se is a feature of this invention and comprises a plurality of circular saw blades 40. Four such blades are here shown by way of illustration but it will be readily appreciated that any suitable number may be provided. Regardless of the number of blades, however, the latter are arranged in the same general relation with respect to each other and are held in proper fixed spaced relation by suitable spacers 42.

According to the present invention the two axially outer saw blades 40 are disposed in spaced parallel relation and radially or at right angles to the driven shaft 24. Also, these two outer blades 40 are spaced according to the width of the notch 15 to be cut in the workpiece 16. The inner saw blades 40 are disposed in parallel relation with respect to each other and are arranged diagonally between the two outer saw blades so that the peripheries thereof are disposed in slight spaced relation with respect to such outer blades at diametrically opposite sides of the saw. In order to hold the several saw blades 40 in proper fixed relation, the spacer or spacers 42 between the inner diagonal blades 40 are of uniform thickness and the spacers 42ª between the inner blades and respective outer blades 40 increase progressively in thickness from one side to the other, as clearly shown in Fig. 4. By positioning the outer spacers 42ª with the thickest portion thereof at diametrically opposed sides of the saw, the inner blades 40 are held solidly in the desired angular position.

By reason of the above arrangement of saw blades 40, the two outer blades cut into the workpiece 16 to define the opposite sides of the notch and the inner blades 40 cut away the material between the outer blades. As suggested, the two inner blades are spaced slightly with respect to the outer blades to afford clearance therebetween, but the clearance is so slight that, in operation, the saw blades tear away any small pieces of material that otherwise might be left by the spacing. In general, two inner blades 40 is sufficient, but it will be readily apparent that any suitable number of blades can be employed in a saw of this character, and that the number of blades to be used in any particular situation will depend largely upon the width of cut to be made.

The carriage 18 comprises a pair of laterally spaced, coplanar, baseboards 44 and 46 mounted on the table 12 and arranged at opposite sides of the saw 14, which baseboards 44 and 46 carry and are joined by upstanding, stationary and movable clamping jaws 48 and 50 respectively. Preferably the carriage 18 extends entirely across the table 12, and it conveniently may project a substantial distance laterally of the table 12 to accomodate and assure ample support for relatively large workpieces 16. The stationary jaw 48 is bolted or otherwise fastened to fixed standards 52 mounted along one edge of baseboards 44 and 46, and the movable jaw 50 is fastened to the baseboards by bolts 54 and nuts 56. As perhaps best shown in Fig. 3, bolts 54 extend upwardly through baseboards 44 and 46 and the jaw 50 with the head portions 58 thereof disposed below the baseboards. Parallel elongated slots 60 (Fig. 2) in baseboards 44 and 46 accommodate the bolts 54 and permit jaw 50 to slide back and forth relative to jaw 48 whereby to accommodate workpieces 16 of varying thickness. Both of the jaws 48 and 50 are cut out or recessed as at 62 immediately above the space between baseboards 44 and 46 to accommodate the upwardly projecting portion of saw 14 (Fig. 4).

As hereinabove described, the carriage 18 is adapted to move back and forth on the table 12 in a direction parallel to the plane of saw 14, and to this end the two baseboards 44 and 46 are mounted on parallel guides 64 which travel in correspondingly shaped guideways 66 in the top of the table 12. The baseboards 44 and 46 are fastened to their respective guides 64 by bolts 68 and wing nuts 70, and suitable spacers 72 are provided between the guides and the baseboards to hold the latter properly spaced above the table 12. Stops 74 bolted or otherwise fastened on table 12 limit movement of the carriage.

In this connection, it will be observed that the workpiece 16 is supported on baseboards 44 and 46 and that the depth of cut made by saw 14 is determined by the distance the workpiece or carriage 18 is elevated above the table. Thus by adding or eliminating spacers 72 the carriage 18 can be selectively raised or lowered to vary the depth of cut by saw 14.

The indexing mechanism for locating workpiece 16 in the carriage 18 comprises a pivoted stop bar 76 which fits in any one of a series of slots 78 provided in the upper edge of the jaw or jaws 48 and 50. Stop bar 76 extends transversely between jaws 48 and 50, and, in operation, the workpiece 16 is positioned with one end thereagainst, as shown in Fig. 2. Thus by properly spacing the slots 78 and moving the stop bar progressively along the series of slots after each operation of the carriage 18, the notches 15 can be made in the workpiece 16 in properly spaced relation.

As suggested, slots 78 can be in either one or both of the jaws 48 and 50, and they can be made directly in the main body of the jaw or in a supplemental plate fastened thereto. In the drawing I have shown slots 78 in the fixed jaw 48 only and in a removable index plate 80 which is fastened to the jaw by cap screws 82 or the like. Jaw 48 is cut away, as at 84, behind the index plate 80 as best shown in Fig. 1. In this manner a number of different indexing plates each having a different slot arrangement can be used, and the machine can be adapted to make substantially any type or size of slip or lock joint.

I have here shown the stop bar 76 pivoted to a block 86 which is mounted for sliding movement on a horizontal bar 88, and the bar 88 is fastened at its ends to adjacent supports 52 by bolts 90 or the like. Preferably the bar 88 is non-circular in transverse section, and the opening in block 86 which fits over the bar is correspondingly shaped so that the block will not turn or pivot on the bar.

Stop bar 76 preferably is provided with a handle 92 and is attached to the handle by a suitable screw 94 which extends through an elongated slot 96. In this manner, the stop bar 76 is adjustable within limits defined by slot 96. In practice, I have found it desirable for the stop bar 76 to extend substantially entirely between the jaws 48 and 50, and the adjustment afforded by slot 96 permits the stop bar to accommodate itself to substantially any adjusted position of the two jaws.

In practice, it is convenient to space the slots 78 so that alternate slots are used for one workpiece 16 and the opposite slots used for the workpiece which is to interfit therewith. In this manner, proper fitting of the tongues and grooves which form the slip or lock joint is assured.

As best shown in Fig. 2, the arm 22 for selectively raising workpiece 16 in the carriage 18 is pivoted at one end as at 96 to the baseboard 44. At its other end the arm 22 is formed with a laterally outwardly extending portion 98, which portion carries an upstanding handle 100. The latter is conveniently positioned at one side of the carriage 18 and laterally of the saw 14 for manual operation, and an elongated slot 102 is provided in jaw 48 behind arm 22 through which the latter is movable to a position under the workpiece 16.

As hereinabove suggested, arm 22 normally is positioned as shown in Fig. 2 and is pushed inwardly as shown by the arrow only when it is desired to make a relatively shallow cut or notch 21 in the workpiece 16. Manifestly it may not be necessary to use the bar 22 in every instance, but the use of a rabbet 20, as shown in Fig. 5, is common in constructions of this type, and inclusion of some simple but efficient means for reducing the depth of cut by a more or less standard dimension greatly enhances the utility and versatility of the machine.

It is to be understood that the form of the invention herewith shown and described is to be taken as a preferred example of the same and that various changes in the size, shape, and arrangement of parts may be resorted to without departing from the spirit of the invention or the scope of the appended claims.

Having thus described the invention, I claim:

1. In a device of the character described, a worktable; a movable carriage on the table having means for clamping a workpiece in edgewise relation with respect to said table and provided with a horizontal slot at the bottom and adjacent one side thereof; and means for cutting a series of uniformly spaced notches in the lower edge of said workpiece including cutting means arranged to act on the lower marginal edge of said work and adapted to cut a notch therein as the carriage reciprocates on the table, indexing mechanism for positioning the workpiece in the carriage in predetermined spaced positions corresponding to the spacing of the notches to be cut therein, and a bar pivoted on the carriage selectively movable through said slot and under the workpiece for holding the lower edge of said workpiece in an adjusted position above the table whereby to regulate the depth of the groove made by said cutting means.

2. In a device of the character described, a worktable; cutting means operable through and above said table; a carriage mounted on the table for translatory movement across said cutting means and provided with a horizontal slot at the bottom thereof and at one side of said cutting means; means associated with the carriage for clamping a workpiece in edgewise relation with respect to the table and in such relation to the cutting means that the latter cuts a groove or notch in the lower marginal portion of the work when the carriage is translated; indexing mechanism mounted on the carriage for selectively positioning the workpiece, said mechanism including a series of spaced guide means arranged transversely to said cutting means and to the direction of travel of said carriage, and an adjustable stop means mounted to enter any of said guide means and engageable therein with the work to locate the same in the carriage, the guide means spaced apart predetermined distances corresponding to the spacing of the grooves to be cut in said workpiece; and a bar pivoted on the carriage selectively movable through said slot and under the workpiece for holding the workpiece in a vertically adjusted position with respect to the table whereby to regulate the depth of cut by said cutting means.

3. The combination as set forth in claim 2 wherein the carriage has upstanding, parallel and mutually adjustable jaws for clamping the workpiece, and wherein said series of guide means is formed in a separate plate element fastened to one of said jaws.

4. In a device of the character described, a work table; cutting means operable through and above said table; a carriage mounted on the table for translatory movement with respect to said cutting means; means associated with the carriage for clamping a workpiece in edgewise relation with respect to the table and in such relation to the cutting means that the latter cuts a groove or notch in the lower marginal portion of the work when the table is translated; indexing mechanism mounted on the carriage for selectively positioning the workpiece, said mechanism including a series of spaced guide means arranged transversely to said cutting means and to the direction of travel of said carriage, an adjustable stop means mounted to enter any of said guide means and engageable with the work to locate the same in the carriage, the guide means being spaced apart predetermined distances corresponding to the spacing of the grooves to be cut in said workpiece, a pivoted arm of substantially uniform thickness movable from a position laterally of the position normally occupied by the workpiece in the carriage to a position under said workpiece, whereby in the latter position of the arm it supports the workpiece in the carriage and raises it a distance corresponding to the thickness of the arm.

5. In a device of the character described, a work table, cutting means operable through and above said table, a carriage mounted on the table for translatory movement with respect to said cutting means and including spaced mutually adjustable parallel jaws for clamping a workpiece, indexing mechanism mounted on the carriage for selectively positioning the workpiece, said mechanism including a series of spaced guide means arranged transversely to said cutting means and in the direction of travel of said carriage, an adjustable stop means mounted to enter any of said guide means and engageable therein with the work to locate the same in the carriage, the guide means being spaced apart predetermined distances corresponding to the spacing of the grooves to be cut in said workpiece, a horizontal arm movable in a slot in one of said jaws from a position laterally thereof to a position under the workpiece, in the latter position said arm being arranged to support the workpiece and to hold it raised from the position which it normally occupies in the carriage.

6. As a subcombination, a carriage unit having a bottom, and upstanding parallel mutually adjustable jaws for clamping a workpiece on said bottom, indexing mechanism for selectively positioning the workpiece laterally or horizontally in the carriage, said indexing mechanism including a separate plate element having a series of spaced guide means, an adjustable stop means mounted to enter any of said guide means and engageable therein with the workpiece to locate the same in the carriage, said guide means being spaced apart predetermined distances corresponding to the spacing of notches or grooves to be cut in the workpiece, and a horizontal arm movable in a slot in one of said jaws from a position laterally thereof to a position under the workpiece, in the latter position said arm being arranged to support the workpiece and to hold it raised from the position which it normally occupies in the carriage.

CARL E. JOHNSON.

REFERENCES CITED

The following references are of record in the file of this patent:

UNITED STATES PATENTS

| Number | Name | Date |
|---|---|---|
| Re. 11,033 | Fox | Oct. 8, 1889 |
| 104,578 | Gore | June 21, 1870 |
| 384,209 | Mentzer | June 5, 1888 |
| 404,377 | Barnes | June 4, 1889 |
| 496,868 | Davis | May 9, 1893 |
| 637,214 | Pangborn | Nov. 14, 1899 |
| 1,098,465 | Weigand | June 2, 1914 |
| 1,113,798 | Lohnes et al. | Oct. 13, 1914 |
| 1,346,269 | Smith | July 13, 1920 |
| 1,735,216 | Sims | Nov. 12, 1929 |
| 2,085,236 | Tautz | July 29, 1937 |
| 2,353,794 | Svikhart | July 18, 1944 |